Patented Jan. 9, 1923.

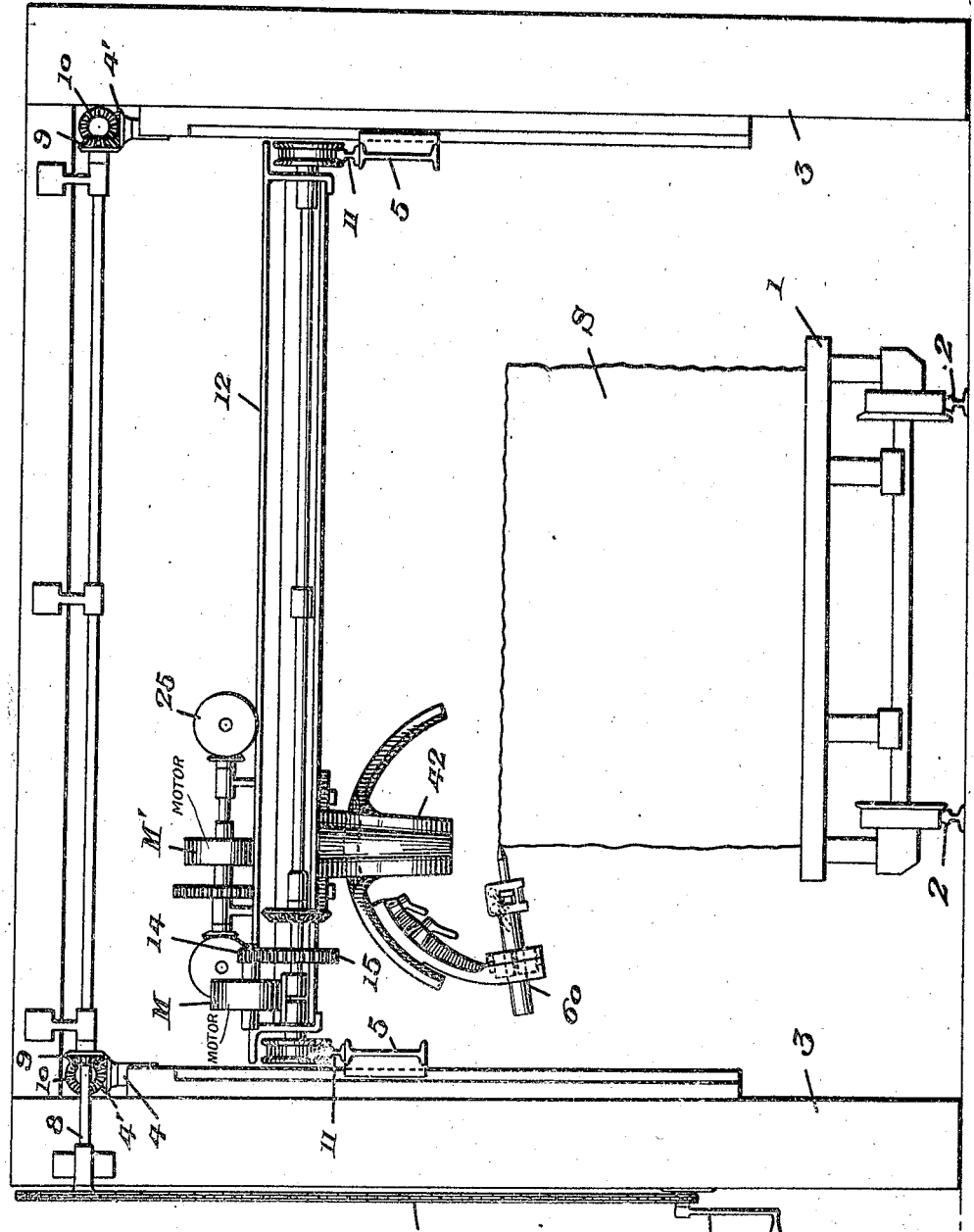

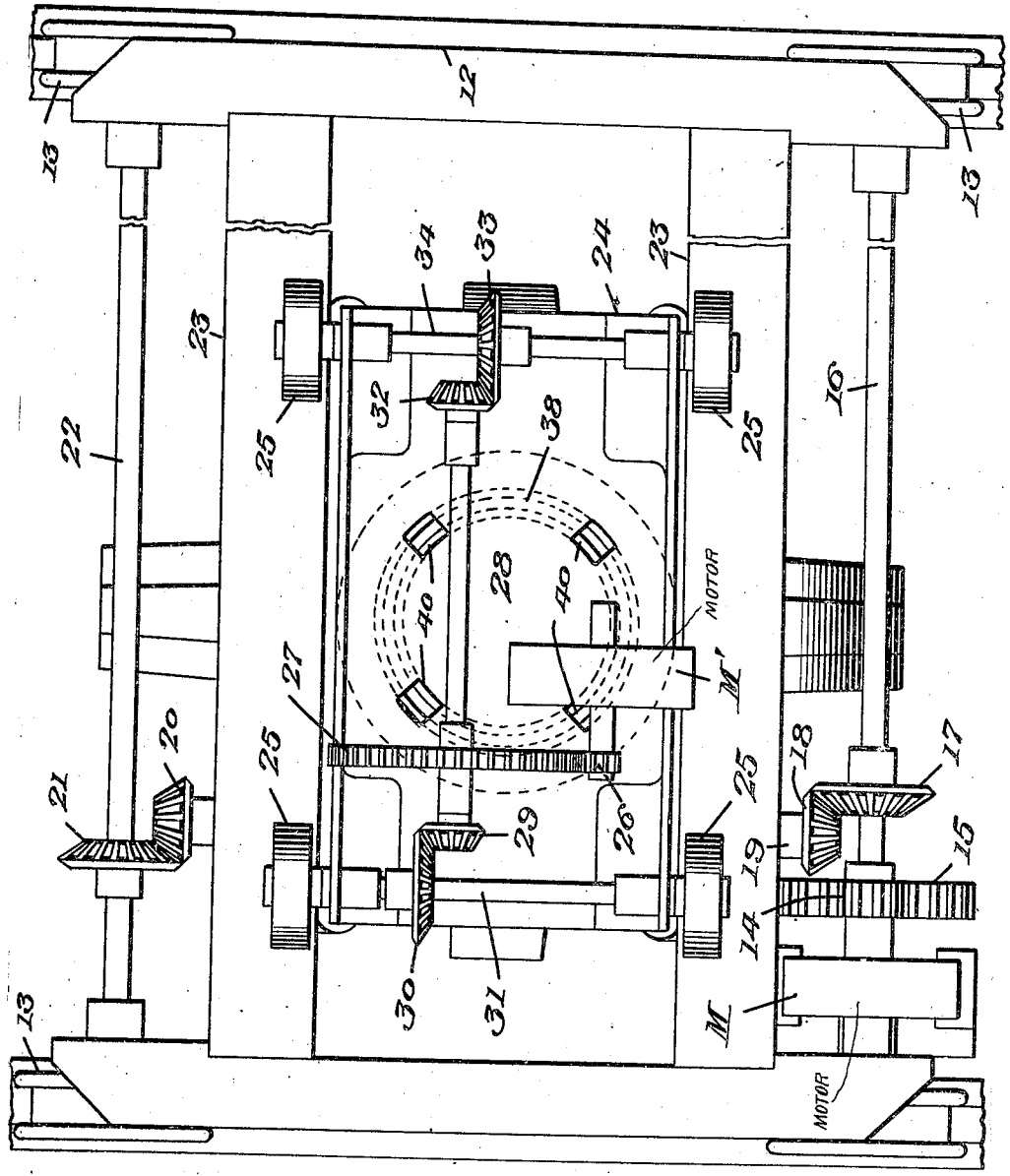

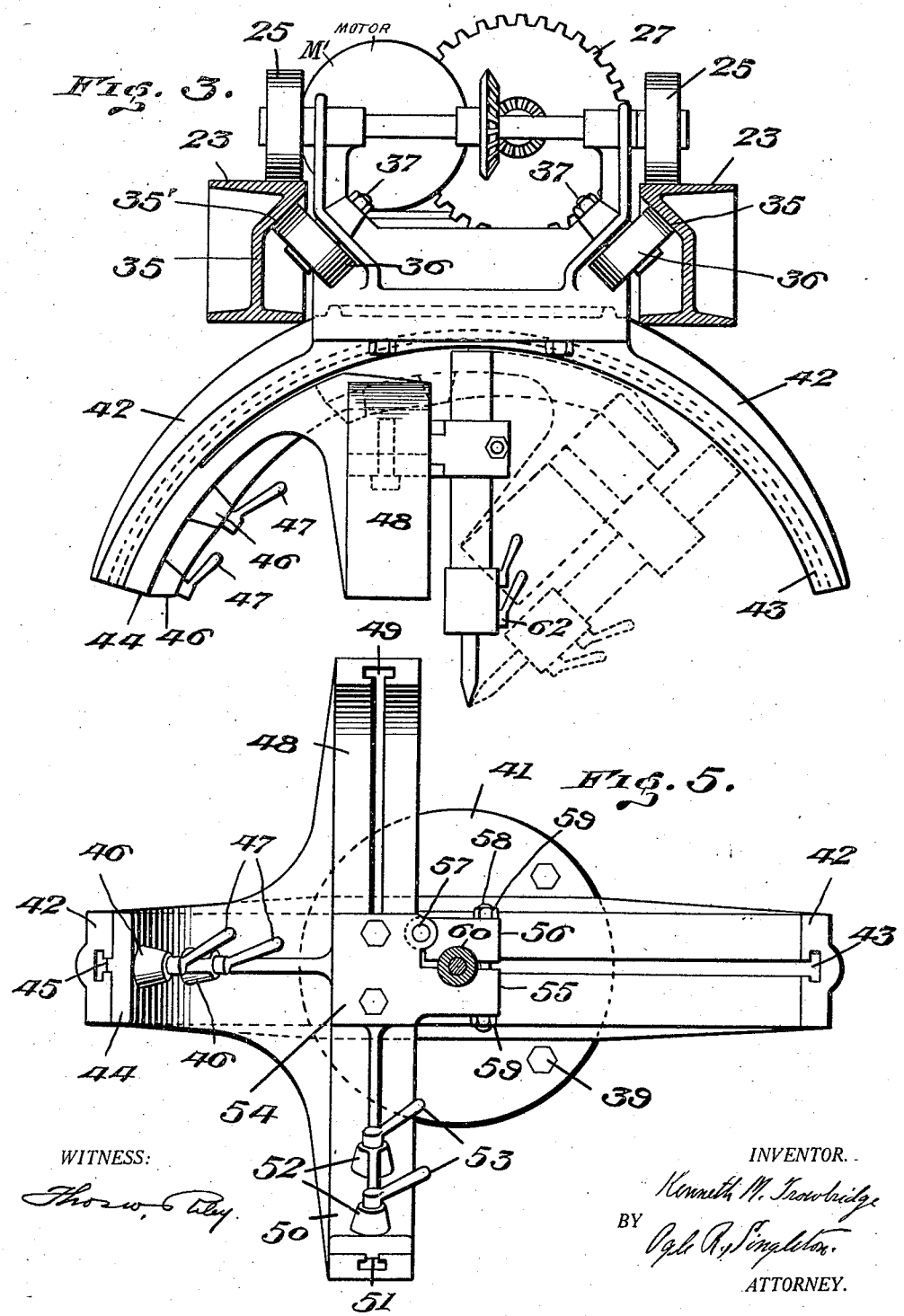

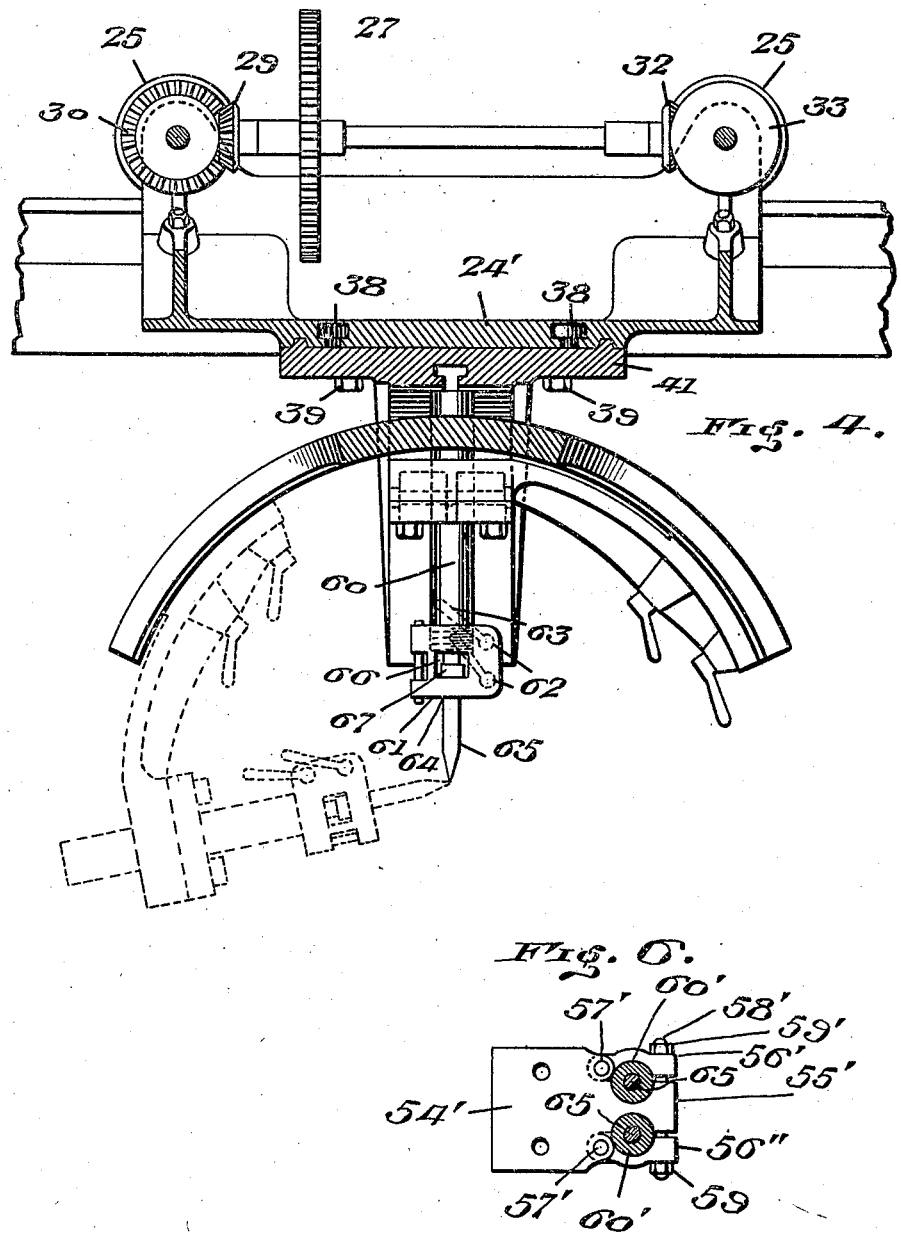

1,441,311

UNITED STATES PATENT OFFICE.

KENNETH M. TROWBRIDGE, OF DALLAS, GEORGIA.

STONE-DRESSING MACHINE.

Application filed October 23, 1919. Serial No. 332,789.

*To all whom it may concern:*

Be it known that I, KENNETH M. TROWBRIDGE, a citizen of the United States, residing at Dallas, in the county of Paulding and State of Georgia, have invented certain new and useful Improvements in Stone-Dressing Machines, of which the following is a specification.

My invention consists in a new and useful improvement in tool holding devices and is designed to provide a suitable carriage for pneumatically operated stone cutting tools, so as to provide means for adjusting such tools to work upon the stone which it is desired to cut, at any desired angle. The improved features of my device are mounted upon the well-known type of overhead travelling carriage, with a transverse travelling carriage, permitting the operative parts to be moved to any desired part of the work. The improved features of my device, consist of an inverted turret which is provided with two sectors arranged at right angles to one another, the main or compound sector being carried in the turret, which is rotatable, and the second sector being slidable, mounted upon the main sector, while the slide carried upon the second sector carries the tool block in which is fastened the stone working tool. I have provided two pneumatically driven motors to actuate the travelling carriages, and the movable sectors are provided with clamps to fix them in any desired position. By the adjustment of these novel features of my device, it is possible to align the tool at any angle to the stone which is to be worked and to change this angle at the will of the operator without raising or lowering the cutting edge of the tool, and thus secure accurate cutting in exactly the manner desired.

The foregoing improvements are clearly indicated in the details of construction of the embodiment of my invention illustrated in the drawings and hereinafter described.

In the drawings:

Figure 1 is a side elevation of my device.

Figure 2 is a top plan view of the two travelling carriages.

Figure 3 is an end view of the transverse carriage showing the inverted turret and sectors.

Fig. 4 is a side view showing the carriage with the turret and sectors in cross section.

Figure 5 is a bottom view of the turret and sectors.

Figure 6 is a bottom view of a modified form of tool block.

In the drawings, the numeral 1 designates a flat car or carriage of any well-known type, suitable for supporting thereon the stone S which it is desired to work with my device. This car 1 is mounted upon the track 2 which traverses the suspension frame-work 3 upon which my device is carried. This frame-work 3 is provided with elevating screws 4, placed in the supporting pillars at intervals of the frame-work 3. So mounted upon these elevating screws 4 as to admit of vertical movement are the girders 5. The elevating screws 4 are operated by means of an operating handle 6 actuating a sprocket chain 7 which rotates a shaft 8 carrying bevel gear wheels 9 which mesh with bevel gear wheels 10, mounted upon shafts transversely disposed to the shaft 8. These gears 10 are mounted at points adjacent the screws 4, and mesh with gears 4' upon the screws 4. Mounted upon the girders 5 are the rails 11 upon which is adapted to travel the carriage 12, provided at each of its four corners with the traction wheels 13. This carriage 12 is provided with a pneumatically driven motor M on the shaft of which is carried the pinion 14 which meshes with the gear 15 mounted upon the shaft 16 upon which are mounted two of the wheels 13 upon one end of the carriage 12. This shaft 16 carries the bevel gear 17 which meshes with the bevel gear 18 upon the transverse shaft 19, upon the opposite end of which is mounted the bevel gear 20 meshing with the bevel gear 21 mounted upon the shaft 22 upon which are mounted the other two wheels 13. The foregoing elements provide means of propelling the carriage 12 by means of the motor M for travel along the rails 11. Mounted upon the carriage 12 are the transverse rails 23 adapted to carry thereon the transverse travelling carriage 24 mounted upon the wheels 25. This transverse travelling carriage 24 is provided with the pneumatically driven motor M' on the shaft of which is carried the pinion 26 which meshes with the gear 27 mounted upon the shaft 28 which is provided at one of its ends adjacent one end of the carriage 24 with a bevel gear 29 meshing with a bevel gear 30 mounted upon the shaft 31 upon which are mounted two of the wheels 25 at one end of the carriage 24. The shaft 28 is provided at its other end adjacent the opposite end of the carriage 24 with the bevel gear 32 meshing with the bevel gear 33 mounted upon the shaft 34 upon which are mounted the other two wheels 25 of the carriage 24. The foregoing elements provide means of propelling the carriage 24 by means of the motor M' for travel along the rails 23. These rails 23 are cast integral with girders 35 having bearing surfaces 35' disposed at an angle of approximately 45° to the rails 23. The carriage 24 is provided with bearing wheels 36 mounted upon the bearings 37 and adapted to bear upon the bearing surfaces 35' to hold the wheels 25 upon the rails 23. The carriage 24 is provided at the center of its bottom surface 24' with a circular channel 38 adapted to carry slidably there n the bolts 39 which can be introduced into the channel 38 by means of the orifices 40 disposed at intervals in the bottom surface 24' and opening into the channel 38. Supported by these bolts 39 and held in rotatable contact with the bottom surface 24' is the rotatable turret 41, cast integral with which is the main sector 42 depending from the turret 41. This main sector 42 is so located that a perpendicular through the center of the bottom surface 24' bisects the sector 42. This main sector 42 is provided with a centrally disposed slot 43 in which is mounted a slide 44 by means of a key 45. Clamps 46 operated by levers 47 are mounted upon this slide 44 and adapted to lock this slide 44 at any point upon the inner face of the sector 42. Cast integral with the slide 44 is a cross sector 48 disposed at right angles to the sector 42 and provided with the centrally disposed slot 49 in which is mounted a slide 50 by means of a key 51. Clamps 52 operated by levers 53 are mounted upon this slide 50 and adapted to lock this slide 50 at any point upon the inner face of the sector 48. Bolted to this slide 50 is a tool block 54 having a fixed jaw 55 extending beyond the line of the slide 50. Pivoted to the block 54 is the swinging jaw 56 on the pivot 57. The jaws 55 and 56 are adapted to be locked by the bolt 58 and the nuts 59 so as to securely hold in position any form of power hammer 60. A stop block 61 is adapted to be clamped upon the hammer 60 by means of the clamps 62 having the operating handles 63. This stop block 61 has the orifice 64 through which operates the cutting tool 65. The stop block 61 also has the centrally disposed opening 66 in which is located the collar 67 upon the cutting tool 65. The collar 67 being larger in diameter than the orifice 64 the play of the cutting tool 65 is limited by the stop block 61, which can be adjusted upon the hammer 60 in such a way as to determine the desired amount of play of the cutting tool 65. In Figure 6 is shown a modified form of tool block 54' adapted to carry multiple hammers. The tool block 54' is provided with a centrally disposed fixed jaw 55', extending beyond the line of the slide 50. Pivoted to the block 54' and located upon either side of the fixed jaw 55' are the pivoted jaws 56' and 56'' on the pivots 57'. The jaws 55', 56' and 56'' are adapted to be locked by the bolt 58' and the nuts 59' so as to securely hold in position any form of power hammer 60'.

From the foregoing description of parts, the use and operation of my device will be readily apparent. The car 1 and track 2 permit the stone S to be brought into operative position beneath my device. The elevating means comprising the vertically adjustable rails 11 can then be adjusted to bring the device to a suitable height above the stone S, and the travelling carriage 12 may be travelled parallel to the track 2 to a point upon the rails 11, convenient for the operation. The transverse travelling carriage 24 may be travelled transversely to the track 2, to position the device in relation to the stone S.

When the carriage 24 has been satisfactorily positioned, the turret 41 may be rotated as desired, to properly position the main sector 42. By means of the handles 47, the clamps 46 may be released and the cross sector 48 may be adjusted as desired, at any point upon the main sector 42, the clamps 46 being set to hold it in adjusted position. Then by a similar operation, the clamps 52 being released, the tool block 54 may be positioned at any desired point upon the sector 48. It will be observed that by means of the adjustment of the sectors 42 and 48 and the tool block 54, it is possible to position the stone cutting tool 65 carried in the tool block 54, so that the tool 65 will operate upon the stone S at any desired angle. It will be understood that by the adjustment of the hammer 60 in the tool block 54, the point of the cutting tool 65 may be positioned at the center or spring point of the arcs of the sectors 42 and 48.

When the desired adjustment of the parts has been made, the air pressure is applied to the tool and also to either one of the pneumatically driven motors M or M'. It will be understood that the device will automatically operate when adjusted, so that the stone cutting tool 65 will travel over the surface of the stone S, in the path desired, and at the same time, the angle of operation of the tood 65 will be maintained by the adjustment of the sectors 42 and 48 and the tool block 54.

Having described my invention, what I claim is:

1. The combination in a tool holding device, of means for holding a tool; and means adapted to adjust the axis of the tool at any desired angle to the plane of the surface to be worked by the tool, said adjusting means being adapted to maintain the working point of the tool in contact with said plane.

2. The combination in a tool holding device, of means for holding a tool; and means adapted to adjust the axis of the tool at any desired angle to the plane of the surface to be worked by the tool, said adjusting means being adapted to guide the holding means in arcuate paths of travel about the point of meeting of said axis and said plane.

3. The combination in a tool holding device, of means for holding a tool; means for moving said holding means vertically; means for moving said holding means horizontally; a second means for moving said holding means horizontally at right angles to the path of the first horizontally moving means; means adapted to rotate said holding means; and means adapted to adjust the axis of the holding means at any desired angle to the plane of the surface to be worked by the tool, said adjusting means being adapted to maintain the working point of the tool in contact with said plane.

4. The combination in a tool holding device, of means for holding a tool; means for moving said holding means vertically; means for moving said holding means horizontally; a second means for moving said holding means horizontally at right angles to the path of the first horizontal moving means; means adapted to rotate said holding means; and means adapted to adjust the axis of the holding means at any desired angle to the plane of the surface to be worked by the tool, said adjusting means being adapted to guide the holding means in arcuate paths of travel about the point of meeting of said axis and said plane.

5. The combination in a tool holding device, of a turret; means for moving said turret vertically; means for moving said turret horizontally; a second means for moving said turret horizontally, at right angles to the path of first horizontally moving means; an arcuate guideway, rotatably mounted on said turret; a second arcuate guideway movably mounted in said first guideway; a tool block movably mounted in said second guideway, adapted to carry a tool.

6. The combination in a tool holding device, of means for holding a tool; means to move said holding means vertically and in two paths horizontally, at right angles to each other; means for actuating said vertical moving means; means for actuating said horizontally moving means; supporting means rotatably mounted on said moving means and adapted to support said holding means; guiding means mounted on said supporting means, and adapted to guide the said holding means in a path describing an arc of substantially 120°; a second guiding means slidably mounted upon the first guiding means and adapted to guide the holding means in a path describing an arc of substantially 120°, and disposed at right angles to the first guiding means.

7. The combination in a tool holding device, of a tool block provided with means for holding a tool therein; a slide member provided with means for holding said block thereon; a guide member adapted to receive said slide member therein; a second slide member upon which said guide member is mounted; a second guide member adapted to receive said second slide member therein; a turret adapted to carry said second guide member; a carriage upon which said turret is mounted; a second carriage upon which said first carriage is movably mounted; a track adapted to support said second carriage thereon; and a frame adapted to sustain said track.

8. The combination in a tool holding device, of a tool block adapted to receive therein a tool; a slide member adapted to carry said tool block thereon; a semi-circular guide member adapted to receive said slide member therein; a second slide member upon which said guide member is mounted, disposed at right angles to said first slide member; a second guide member adapted to receive said second slide member therein; a turret upon which said second guide member is mounted; a travelling carriage upon which said turret is rotatably mounted; a second travelling carriage upon which said first carriage is adapted to travel, the paths of travel of the two carriages being disposed at right angles to each other; a track upon which said second carriage is adapted to travel; and girders upon which said track is mounted, adapted to be raised and lowered.

9. The combination in a tool holding device, of a frame; a track mounted on said frame; a travelling carriage mounted on said track; a second travelling carriage mounted on said first carriage; a turret mounted on said second carriage; a guide member mounted on said turret; a slide member mounted in said guide member; a second guide member mounted on said slide member; a second slide member mounted in said second guide member; and a tool block mounted on said second slide member.

10. The combination in a tool holding device, of a frame; girders mounted on said frame and adapted to be manually adjusted vertically in relation thereto; a track mounted on said girders; a travelling carriage mounted on said track and provided with pneumatically propulsive means; a second travelling carriage mounted on said first carriage and provided with propulsive means; a turret rotatably suspended from said second carriage; a guide member depending from said turret and provided with an arcuate guideway; a slide member mounted in said guide member; clamps on said slide member adapted to clamp said slide member at any desired point on said guideway; a second guide member depending from said slide member, disposed at right angles to said first guide member, and provided with an arcuate guideway; a second slide member mounted in said second guide member; clamps on said second slide member adapted to clamp said second slide member at any desired point on said second guideway; and a tool block mounted on said second slide member and provided with clamping means adapted to hold a tool therein.

11. The combination in a tool holding device, of a frame; girders mounted on said frame and adapted to be adjusted vertically in relation thereto; a track mounted on said girders; a travelling carriage mounted on said track and provided with propulsive means; a second travelling carriage mounted on said first carriage and provided with propulsive means; a turret rotatably suspended from said second carriage; a guide member depending from the center of said turret and provided with an arcuate guideway so disposed that the horizontal plane of said turret is tangential to said guideway, the perpendicular to said plane at the tangent point bisecting said guideway; a slide member mounted in said guide member; clamps on said slide member adapted to clamp said slide member at any desired point on said guideway; a second guide member depending from said slide member, disposed at right angles to said first guide member, and provided with an arcuate guideway; a second slide member mounted in said second guide member; clamps on said second slide member adapted to clamp said second slide member at any desired point on said second guideway; and a tool block mounted on said second slide member and provided with clamping means adapted to hold a tool therein.

12. The combination in a tool holding device, of a frame; girders mounted on said frame and adapted to be adjusted vertically in relation thereto; a track mounted on said girders; a travelling carriage mounted on said track and provided with propulsive means; a second travelling carriage mounted on said first carriage and provided with propulsive means; a turret rotatably suspended from said second carriage; a guide member depending from the center of said turret and provided with an arcuate guideway so disposed that the horizontal plane of said turret is tangential to said guideway, the perpendicular to said plane at the tangent point bisecting said guideway; a slide member mounted in said guide member; clamps on said slide member adapted to clamp said slide member at any desired point on said guideway; a second guide member depending from said slide member, disposed at right angles to said first guide member, and provided with an arcuate guideway; a second slide member mounted in said second guide member; clamps on said second slide member adapted to clamp said second slide member at any desired point on said second guideway; a tool block mounted on said second slide member; and means adapted to retain the tool in said tool block.

13. The combination in a tool holding device, of a frame; girders mounted on said frame and adapted to be adjusted vertically in relation thereto; a track mounted on said girders; a travelling carriage mounted on said track and provided with propulsive means; a second travelling carriage mounted on said first carriage and provided with propulsive means; a turret rotatably suspended from said second carriage; a guide member depending from the center of said turret and provided with an arcuate guideway so disposed that the horizontal plane of said turret is tangential to said guideway, the perpendicular to said plane at the tangent point bisecting said guideway; a slide member mounted on said guide member; clamps on said slide member adapted to clamp said slide member at any desired point on said guideway; a second guide member depending from said slide member, disposed at right angles to said first guide member, and provided with an arcuate guideway; a second slide member mounted in said second guide member; clamps on said second slide member adapted to clamp said second slide member at any desired point on said second guideway; a tool block mounted on said second slide member; and means adapted to retain the tool in said tool block and limit the movement of the tool relative to said tool block.

In testimony whereof I affix my signature.

KENNETH M. TROWBRIDGE.